(12) United States Patent
Theis

(10) Patent No.: US 6,497,092 B1
(45) Date of Patent: Dec. 24, 2002

(54) $NO_x$ ABSORBER DIAGNOSTICS AND AUTOMOTIVE EXHAUST CONTROL SYSTEM UTILIZING THE SAME

(75) Inventor: Joseph Robert Theis, Grand Blanc, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/272,004

(22) Filed: Mar. 18, 1999

(51) Int. Cl.$^7$ .............................................. F01N 3/00
(52) U.S. Cl. .............................. 60/274; 60/276; 60/285; 60/301
(58) Field of Search ........................... 60/274, 276, 285, 60/301

(56) References Cited

U.S. PATENT DOCUMENTS

| | | | |
|---|---|---|---|
| 5,088,281 A | * 2/1992 | Izutani et al. .................. | 60/274 |
| 5,280,707 A | * 1/1994 | Nakashima et al. .......... | 60/276 |
| 5,361,582 A | * 11/1994 | Uchida et al. ................ | 60/276 |
| 5,388,406 A | * 2/1995 | Takeshima et al. ........... | 60/297 |
| 5,437,153 A | 8/1995 | Takeshima et al. ........... | 60/276 |
| 5,473,887 A | 12/1995 | Takeshima et al. ........... | 60/276 |
| 5,483,795 A | 1/1996 | Katoh et al. .................. | 60/276 |
| 5,577,382 A | 11/1996 | Kihara et al. ................. | 60/276 |
| 5,713,199 A | 2/1998 | Takeshima et al. ........... | 60/276 |
| 5,735,119 A | 4/1998 | Asanuma et al. ............. | 60/276 |
| 5,743,084 A | 4/1998 | Hepburn ....................... | 60/276 |

* cited by examiner

*Primary Examiner*—Thomas Denion
*Assistant Examiner*—Thai-Ba Trieu
(74) *Attorney, Agent, or Firm*—Vincent A. Cichosz

(57) ABSTRACT

An exhaust control system for an automotive internal combustion engine having an exhaust system that includes a $NO_x$ adsorber to trap and reduce $NO_x$ emissions from the engine. The engine is operated using an air/fuel ratio that alternates between lean and rich, with the adsorber storing $NO_x$ during the lean periods of combustion and catalytically reducing the $NO_x$ during the rich periods of combustion. The system determines the amount of $NO_x$ stored in the adsorber using upstream and downstream $O_2$ sensors. The release of stored $NO_x$ and $O_2$ at the beginning of the rich regeneration causes a delay between switching of the sensors. The system determines how much of this delay is due to the release of stored $O_2$ and subtracts that amount from the total delay. There is also a switching delay at the beginning of each lean period due to the storage of $O_2$ in the adsorber. This storage delay is used to approximate the delay due to the release of $O_2$ at the beginning of regeneration and this delay is therefore subtracted from the total delay to determine the amount of delay due to the release of $NO_x$ alone. The amount of $NO_x$ stored is then determined and used along with an estimate of the engine-out $NO_x$ to determine the storage efficiency of the adsorber. The amount of engine-out $NO_x$ that the absorber can handle during the next lean period is then adjusted depending on whether this storage efficiency is greater or less than a desired efficiency.

27 Claims, 9 Drawing Sheets

| Temperature (°C) | 225 | 250 | 275 | 300 | 325 | 350 | 375 | 400 | 425 | 450 | 475 | 500 | 525 |
|---|---|---|---|---|---|---|---|---|---|---|---|---|---|
| NOx Storage Limit (grams) | 0.3 | 0.8 | 1.2 | 1.5 | 1.9 | 2.8 | 4.2 | 3.1 | 2.0 | 1.0 | 0.5 | 0.3 | 0.2 |

NO$_x$ ABSORBER DIAGNOSTICS AND AUTOMOTIVE EXHAUST CONTROL SYSTEM UTILIZING THE SAME

TECHNICAL FIELD

This invention relates generally to automotive exhaust systems and, in particular, to diagnostic techniques for determining the NO$_x$ storage capacity of a NO$_x$ adsorber used in such exhaust systems. This invention also relates to techniques for operating an internal combustion engine in accordance with the storage capacity of a NO$_x$ adsorber connected in the exhaust system so as to maximize performance of the engine while minimizing the NO$_x$ exhausted into the environment.

BACKGROUND OF THE INVENTION

Exhaust gas treatment devices have been used as original equipment by automotive manufacturers for many years as a way to reduce the HC, CO, and NO$_x$ emissions from automotive internal combustion engines. Initially, thermal afterburning was used to reduce emissions by burning the unburnt fuel contained in the exhaust gas. However, this approach has been found to only provide limited benefits and is not useful in reducing NO$_x$ emissions to acceptable levels. This technique has primarily been replaced by catalytic converters which utilize a monolithic structure containing noble metals (Pt, Rh, Pd) to provide catalytic afterburning of the engine emissions. Today's more advanced systems utilize a three-way catalytic converter that is capable of simultaneously reducing the emissions of HC, CO, and NO$_x$. To maximize the efficiency of these three-way converters, the engines are typically run at stoichiometry; that is, they are run at an air/fuel ratio in which the amount of air (oxygen) inducted into the cylinder is no more and no less than required to burn all of the injected fuel. One problem with this mode of engine operation is that it is not always possible or desirable to operate the engine at stoichiometry. Rather, for purposes of maximizing fuel economy, it is often desirable to operate the engine in a lean combustion condition in which the amount of intake air is greater than is needed to burn the injected fuel. Conversely, during engine warm up and during periods of acceleration when torque is required, it is desirable for driveability to operate the engine in a rich combustion condition in which the amount of fuel injected is greater than the amount of fuel that the inducted air can burn.

More recently, NO$_x$ adsorbers have been developed which store NO$_x$ during periods of lean engine combustion (i.e., excess air) and then periodically release the NO$_x$ during periods of rich combustion (i.e., excess fuel) so that the NO$_x$ can be catalytically reduced due to the presence of excess HC, CO, and H$_2$. See, for example, U.S. Pat. No. 5,473,887 to Takeshima et al. which discloses an exhaust purification system that operates to reduce NO$_x$ emissions by periodically running the engine at a rich combustion condition to release and catalytically reduce the NO$_x$ stored during the periods of normal lean engine operation. Since the initial development of NO$_x$ adsorbers, many refinements have been developed to help further regulate and reduce the NO$_x$ emissions from the exhaust system. For example, U.S. Pat. No. 5,483,795 to Katoh et al. discloses a system in which an exhaust gas oxygen sensor (referred to herein as an O$_2$ sensor) is placed downstream of the NO$_x$ adsorber to determine the length of time needed to release all of the stored NO$_x$ during rich engine operation. The Katoh et al. system works on the principle that after the engine is switched from lean to rich combustion, there is a delay before the downstream O$_2$ sensor detects a rich combustion condition, with this delay being due to the release of NO$_x$ which reacts with the HC, CO, H$_2$ contained in the exhaust. Thus, switching of the downstream O$_2$ sensor to a voltage indicative of a rich condition is used as a signal that all of the NO$_x$ stored in the NO$_x$ adsorber has been released and that the engine can therefore be returned to lean operation.

The amount of NO$_x$ that can be stored in a NO$_x$ adsorber during any one lean cycle is dependent upon the state, volume, and temperature of the NO$_x$ adsorber. Over time, NO$_x$ adsorbers can deteriorate due to, for example, poisoning from sulfur oxides. Accordingly, exhaust purification systems have been suggested which determine the degree of deterioration and respond accordingly. For example, U.S. Pat. No. 5,577,382 to Kihara et al. discloses a system in which the peak magnitude of a downstream O$_2$ sensor is used to determine when the NO$_x$ adsorber has sufficiently deteriorated that it needs to be regenerated by running the engine rich until the stored sulfur oxides are released. Similarly, U.S. Pat. No. 5,735,119 to Asanuma et al. discloses a system which detects the degree of deterioration of the NO$_x$ adsorber, again using an O$_2$ sensor. As the degree of deterioration increases, the system decreases the length of engine operating time at both the lean and rich combustion conditions. This has the effect of reducing the amount of NO$_x$ supplied to the NO$_x$ adsorber (i.e., the amount of engine-out NOR) before the rich regeneration of the NO$_x$ adsorber, and also has the effect of reducing the length of the rich regeneration, since there will be less NO$_x$ adsorbed and hence, less regeneration time required.

Another approach for achieving efficient use of a NO$_x$ adsorber is to determine the amount of engine-out NO$_x$ as the engine is operated in its lean combustion mode and to then switch to rich combustion when the total engine-out NO$_x$ supplied during the current lean period equals the adsorption capacity of the NO$_x$ adsorber. See, for example, U.S. Pat. No. 5,437,153 to Takeshima et al. Engine-out NO$_x$ can also be used along with other variables to determine the state of the NO$_x$ adsorber. See, for example, U.S. Pat. No. 5,743,084 to Hepburn which discloses a method for monitoring a NO$_x$ trap in which upstream and downstream O$_2$ sensors are used to determine the amount of NO$_x$ stored in the NO$_x$ trap, with the stored NO$_x$ amount being used along with an estimated engine-out NO$_x$ to determine the storage efficiency of the NO$_x$ trap. Thereafter, the period of lean engine operation is reduced as the determined storage efficiency drops. This system is based upon the same essential principle as that disclosed in the above-noted Katoh et al. patent; namely, that the delay in switching of the downstream O$_2$ sensor when engine operation changes from lean to rich is due to the release of NO$_x$ stored in the NO$_x$ trap, and for a given temperature, this delay time provides a quantitative measure of the amount of NO$_x$ released (and therefore previously stored) in the NO$_x$ trap.

One problem with using the O$_2$ sensor delay time as a measure of the amount of stored NO$_x$ is that the delay time is not only due to the release of stored NO$_x$, but also to the release of oxygen stored during the lean period. Thus, in U.S. Pat. No. 5,713,199 to Takeshima et al., the amount of delay time due to the release of oxygen is determined and is subtracted from the total O$_2$ sensor delay to determine the amount of delay due to the release of NO$_x$ only. This truer delay time can then be used to more accurately estimate the amount of NO$_x$ stored during the previous lean period. The amount of delay time due to the release of oxygen is determined by a separate lean/rich cycle in which the engine must be operated lean for a period of time that is long enough to fully store the oxygen in the $NO_x$ adsorber, but is short enough that no appreciable $NO_x$ has yet been stored. The engine is then switched to rich operation, and the delay time between the upstream and downstream $O_2$ sensors is taken as a measure of the delay due to the release of oxygen only in the $NO_x$ adsorber. This delay is later subtracted from the total delay when the engine is operated in its normal lean/rich cycle. While providing a more accurate measurement of the delay due to the release of $NO_x$ only (and, thus a more accurate measurement of the amount of stored $NO_x$), this system requires a separate abnormal lean/rich engine cycle to determine the oxygen release delay time, and this cycle may need to be periodically repeated as the state of the $NO_x$ adsorber changes. Also, this additional rich cycle requires additional fuel consumption. Accordingly, there exists a need for a $NO_x$ adsorber diagnostic system which provides an accurate measure of the stored $NO_x$ using measured $O_2$ sensor delay times without requiring an otherwise unnecessary separate lean/rich engine cycle to determine the $O_2$ sensor delay due to the release of stored oxygen. There also exists a need for an engine control system which provides closed loop control of the amount of engine-out $NO_x$ supplied to the $NO_x$ adsorber between regenerations in accordance with the continuously variable $NO_x$ handling capability of the $NO_x$ adsorber and which therefore minimizes the tailpipe $NO_x$ emissions.

SUMMARY OF THE INVENTION

The present invention provides an exhaust control system for diagnosing the state of a $NO_x$ adsorber and operating an internal combustion engine in a manner so as to minimize the emission of $NO_x$ from the $NO_x$ adsorber. As with many prior art systems, the engine is operated using a lean/rich cycle in which $NO_x$ stored by the $NO_x$ adsorber during the lean portion of the cycle is released and catalytically reduced during the rich regeneration portion of the cycle. Once all of the stored $NO_x$ has been released, the engine is switched back to lean for the start of another cycle. The system utilizes a first $O_2$ sensor (which can be a switching $O_2$ sensor or wide-range air/fuel sensor) located upstream of the $NO_x$ adsorber and a second $O_2$ sensor located downstream of the $NO_x$ adsorber.

In accordance with one aspect of the invention, the determination of the amount of $NO_x$ stored by the adsorber is based upon a realization that the delay in switching between the upstream and downstream $O_2$ sensors during the rich-to-lean transition is due to the storage of oxygen by the $NO_x$ adsorber at the beginning of the succeeding lean period and that this delay can be used to estimate the amount of time that was required to release the stored oxygen during the lean-to-rich transition. Thus, the delay in switching between the upstream and downstream $O_2$ sensors at the end of the rich regeneration period (the $O_2$ storage time) is used as an indication of the amount of switching delay due to oxygen release during the lean-to-rich transition, and this $O_2$ storage time delay is subtracted from the total delay between switching of the sensors during the lean-to-rich transition (the combined $NO_x/O_2$ release time) to thereby obtain an accurate estimate of the amount of sensor switching delay due to the release of the $NO_x$ alone (the $NO_x$ release time). That is:

$NO_x$ release time=the combined release time–$O_2$ release time, where: the $O_2$ release time=the measured $O_2$ storage time.

Once the $NO_x$ release time is determined, the amount of $NO_x$ released by the adsorber during the rich regeneration can be determined and this amount can be taken as a good estimate of the amount of $NO_x$ that was stored during the previous lean period. In this way, the delay in switching of the sensors due to stored oxygen can be determined and eliminated from the $NO_x$ calculation without requiring separate lean/rich operating cycles, as are utilized in the system disclosed in the above-noted U.S. Pat. No. 5,713,199.

Accordingly, an accurate estimate of the amount of $NO_x$ stored and released during a particular lean period can be determined using the following steps. First, the engine is run at a lean air/fuel ratio for a period of time and then is switched to a rich air/fuel ratio. The combined $NO_x/O_2$ release time is then determined based upon the amount of time between detection by the upstream $O_2$ sensor of a rich combustion condition and detection by the downstream $O_2$ sensor of the rich combustion condition. Next, the engine is switched back to operation at a lean air/fuel ratio and the $O_2$ storage time is determined based upon the amount of time between detection by the upstream $O_2$ sensor of a lean combustion condition and detection by the downstream $O_2$ sensor of the lean combustion condition. Then, the $NO_x$ release time is determined using the combined $NO_x/O_2$ release time and the $O_2$ storage time, preferably by subtracting the $O_2$ storage time from the combined release time. Preferably, the $NO_x$ release time is used along with the exhaust flow rate and the magnitude of the air/fuel ratio during regeneration to determine the amount of $NO_x$ released (and therefore the amount stored during the previous lean period). Thereafter, operation of the engine at the lean air/fuel ratio is continued for a length of time that is dependent upon the calculated amount of $NO_x$ released.

In accordance with another aspect of the invention, this technique for determining the the amount of $NO_x$ stored during the previous lean period (i.e., stored $NO_x$ amount) can be used as a part of an exhaust control system in which the stored $NO_x$ amount is used along with the exhaust gas temperature and other factors to determine the point at which the next rich regeneration will take place. This can be accomplished by using the stored $NO_x$ amount to determine a $NO_x$ storage limit that represents the amount of engine-out $NO_x$ that the adsorber is expected to be capable of handling at a particular efficiency. During the next lean period, the amount of engine-out $NO_x$ is then monitored and another rich regeneration is performed when the engine-out $NO_x$ reaches this $NO_x$ storage limit.

In accordance with yet another aspect of the invention, there is provided a system for determining the storage efficiency of the $NO_x$ adsorber and controlling operation of the engine based upon the determined efficiency. The storage efficiency is determined using the amount of $NO_x$ stored during the previous lean period and the amount of engine-out $NO_x$ produced during that same period. The amount of stored $NO_x$ can be determined in the manner described above. The engine-out $NO_x$ can be determined in a known manner using such factors as the air flow rate, engine load, engine speed, EGR setting, spark advance, and the magnitude of the air/fuel ratio during the lean period. The $NO_x$ adsorber storage efficiency is then used to determine the $NO_x$ storage limit that is utilized to determine the point at which the next rich regeneration should begin.

The $NO_x$ storage limit can be selected from values stored in memory and can be adjusted up or down depending upon whether the determined storage efficiency of the $NO_x$ adsorber is greater than or less than a desired efficiency. Then, when the amount of $NO_x$ stored falls below a selected threshold, a sulfur purge can be performed (thereby increasing the actual storage capacity) and, upon detecting that the storage efficiency has increased, the system will automatically respond by increasing the determined $NO_x$ storage limit that is used to determine how long the engine will be run lean each cycle. This provides closed loop control of the $NO_x$ emissions, allowing the system to utilize whatever storage capacity exists in the $NO_x$ adsorber at any one time.

BRIEF DESCRIPTION OF THE DRAWINGS

A preferred exemplary embodiment of the present invention will hereinafter be described in conjunction with the appended drawings, wherein like designations denote like elements, and.

DESCRIPTION OF THE PREFERRED EMBODIMENT

Figure 1:
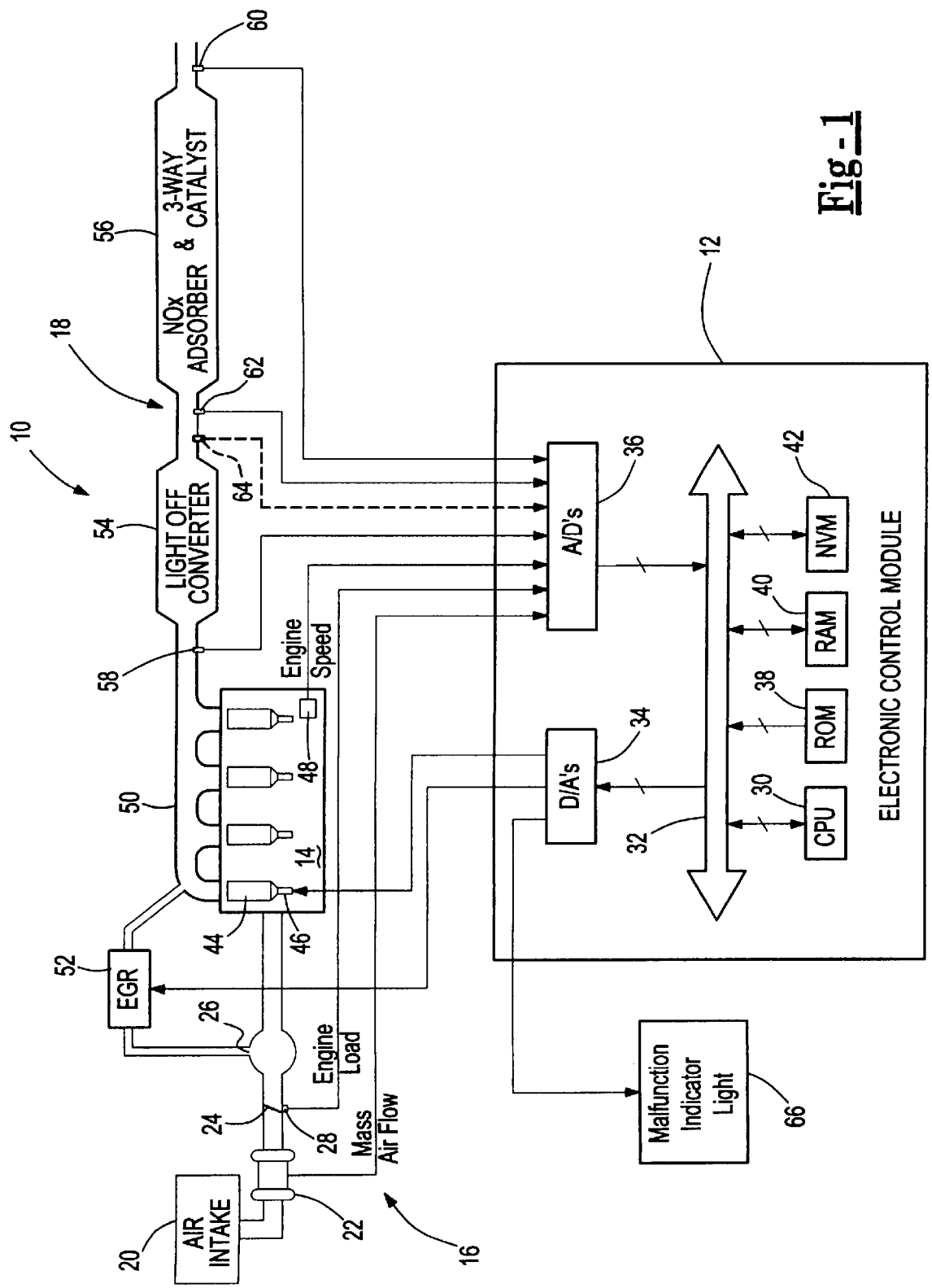
FIG. 1 is a diagrammatic view of a preferred embodiment of an automotive exhaust control system of the present invention, showing the exhaust control system integrated into a vehicle electronic control module that is used to control operation of the vehicle engine.

Referring to FIG. 1, there is shown an automotive exhaust control system, designated generally as 10, that is integrated in with an automotive engine electronic control module (ECM) 12. Exhaust control system 10 is used in connection with an internal combustion engine 14 having an air inlet section 16 and an exhaust system 18. In general, exhaust control system 10 monitors engine performance and exhaust output and controls engine operation in a manner that seeks to maximize engine performance and fuel economy, while minimizing emission of HC, CO, $NO_x$ and other contaminants.

Air inlet section 16 includes an air intake 20 that is connected to an intake manifold (not shown) on engine 14 via a mass air flow sensor 22, a throttle 24, and an exhaust gas recirculation (EGR) injection port 26. Air flow sensor 22 is used to provide ECM 12 with a signal indicative of the rate of air inducted into engine 14. The engine load is detected by a throttle position sensor 28 that is connected to throttle 24. The measured flow rate and engine load are used along with other variables by the electronic control module 12 to determine the amount of $NO_x$ produced by the engine during each lean cycle, as will be discussed further below.

Electronic control module 12 can have a conventional hardware design, including a microprocessor (CPU) 30 connected via data, control, and address buses 32 to a set of output digital to analog converters (D/A's) 34, a set of input analog to digital converters (A/D's) 36, a ROM 38, RAM 40, as well as a battery-backed up or otherwise non-volatile memory (NVM) 42. As is well known, ROM 38 can be used to hard code programming and calibration or other predetermined data, RAM 40 can be used to temporarily store program instructions, data, and variables, and NVM 42 can be used to store data and other alterable data that must be stored in the absence of operating power to electronic control module 12. These memory components can be implemented separately or can exist along with microprocessor 30 as on-board memory. Also, as will be appreciated by those skilled in the art, in addition to its use in controlling fuel injection and exhaust gas recirculation as a part of the exhaust control system 10, the electronic control module 12 is also used to control spark ignition timing, run on-board diagnostics (OBD), as well as perform other conventional tasks. Thus, in the illustrated embodiment, the control and monitoring functions are implemented by ECM 12 as an integral part of its other engine control functions, and it will be understood that exhaust control system 10 could be implemented separately, if desired.

Engine 14 can be a typical gasoline or diesel powered internal combustion engine having a plurality of cylinders 44, each of which includes a fuel injector 46 that is connected to the D/A's 34 so that ECM 12 can control the timing and quantity of fuel injected during each stroke. Engine 14 also includes an engine rpm sensor 48 that is connected to the A/D's 36 to provide ECM 12 with a signal indicative of engine speed. As with the engine load data provided by throttle position sensor 28, the engine speed is used along with other variables to determine the amount of engine-out $NO_x$ during each lean period.

Exhaust system 18 includes an exhaust manifold 50, EGR valve 52, lightoff converter 54, catalytic converter 56, upstream $O_2$ sensor 58, downstream $O_2$ sensor 60, temperature sensor 62, and an optional switching $O_2$ or wide-range air/fuel (WRAF) sensor 64 at the inlet of converter 56. EGR valve 52 can be used in a conventional manner to recirculate exhaust gases back through EGR injection port 26 to the air intake manifold. It is connected to the D/A's 34 for control by microprocessor 30. A malfunction indicator light 66 is also connected to D/A's 34 and can be used to warn the vehicle driver of an abnormal engine operation due to, for example, poor $NO_x$ adsorber performance. Lightoff converter 54 is located close to exhaust manifold 50 and is used to promote fast light-off so as to reduce emissions when the engine 14 is first started. Catalytic converter 56 is an integrated unit that includes both a $NO_x$ adsorber function and three-way function. In the illustrated embodiment, the $NO_x$ adsorbent can either be incorporated into converter 56 as a separate catalyst brick (located upstream of the three-way brick) or as a unitary part of the three-way catalyst. $O_2$ sensor 58 will typically be a wide-range air/fuel sensor that may additionally be used for other emissions purposes, such as engine control. However, in addition to or in lieu of sensor 58, switching $O_2$ sensor 64 can be used. The downstream $O_2$ sensor 60 is a switching $O_2$ sensor, although it will be appreciated that sensor 60 can be a WRAF sensor if desired. Temperature sensor 62 can be a conventional sensor and, as will be discussed below, is used to determine the exhaust gas temperature for the purposes of determining the $NO_x$ storage capacity of the $NO_x$ adsorber 56 at any particular time.

Sensors 58, 60, 62, and 64 are connected to the A/D's 36 to provide microprocessor 30 with data indicative of the operational conditions that they monitor. Using this data along with the other sensor data from engine 14 and air inlet section 16, microprocessor 30 operates under control of a main program stored in ROM 38 to control fuel injection to the cylinders 44 and, within the constraints posed by the vehicle operator in terms of, for example, throttle position, microprocessor 30 runs under program control to maximize fuel economy and minimize emissions by cycling the engine operation between an extended lean period and a shorter rich regeneration period.

Before describing the use of electronic control module 12 to control the lean/rich combustion cycle, various features of the emissions content both upstream and downstream of $NO_x$ adsorber 56 should be considered. As discussed above, $NO_x$ and $O_2$ are stored in the $NO_x$ adsorber during lean engine operation and are then released for reaction with the HC, CO, and $H_2$ contained in the engine-out exhaust during the rich regeneration period. The release of this stored $NO_x$ and $O_2$ causes a delay between the time at which the upstream $O_2$ sensor sees the switch to rich combustion and the time at which the downstream $O_2$ sensor sees this switch. This delay is used to determine the amount of $NO_x$ stored during the lean period and this stored $NO_x$ amount is used to determine the storage efficiency of the $NO_x$ adsorber so that during the next lean cycle, an adjustment can be made if necessary to properly utilize the current storage capacity of the $NO_x$ adsorber.

Figure 2:
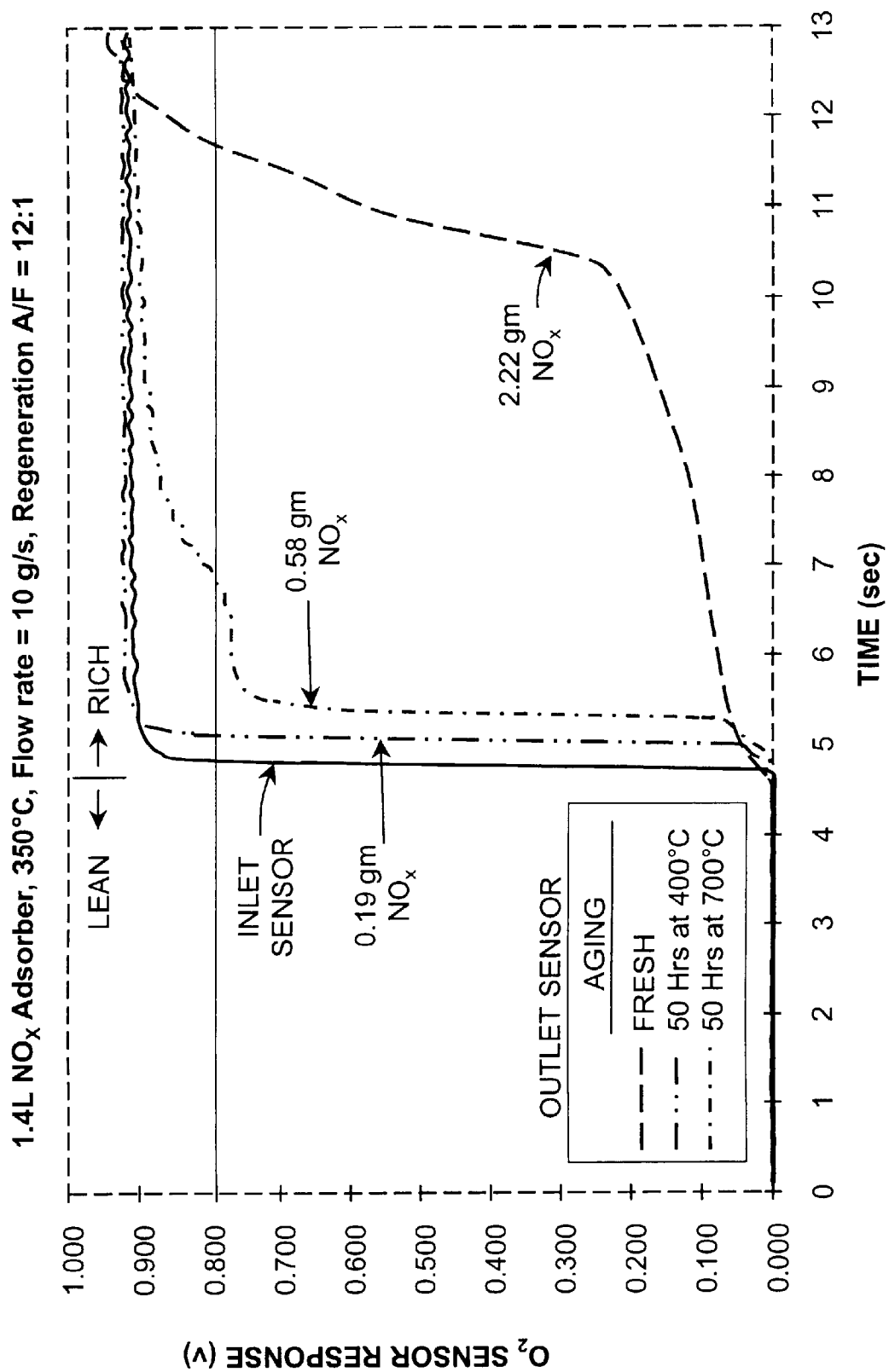
FIG. 2 is a graph showing the delay between switching of the upstream and downstream $O_2$ sensors at the beginning of the rich regeneration period for various amounts of stored $NO_x$ resulting from different agings of the $NO_x$ adsorber.

Referring now to FIG. 2, there is shown a graph depicting the delay between switching of an upstream, or inlet, sensor and a downstream, or outlet, sensor for different stored amounts of $NO_x$ resulting from different agings of the $NO_x$ adsorber. The data used to generate this graph was measured using a 1.4 liter $NO_x$ adsorber operating at a temperature of 350° C. with a flow rate of 10 grams/sec and regeneration air/fuel ratio of 12:1. As this graph indicates, the delay between the inlet sensor (shown as a solid line) and the outlet sensor (shown as a broken line) depends on the amount of $NO_x$ stored in the $NO_x$ adsorber.

Figure 3:
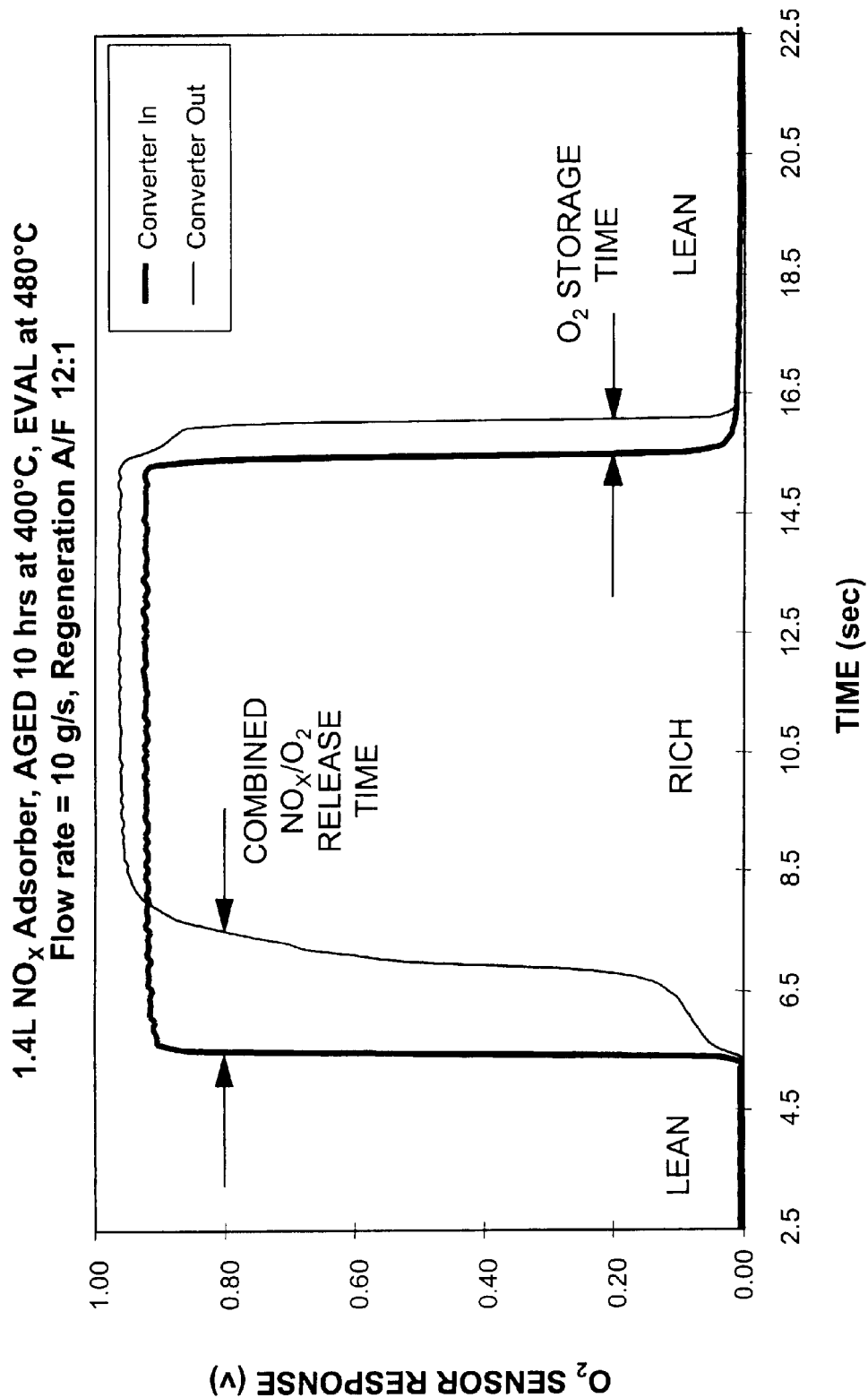
FIG. 3 is a graph showing the $O_2$ sensor switching delay due to the release of $NO_x$ and $O_2$ at the beginning of the rich regeneration period, and the $O_2$ sensor switching delay due to the storage of $O_2$ at the beginning of the succeeding lean period.

The delay between the upstream and downstream $O_2$ sensors at the beginning of the rich regeneration cycle includes a component that is due to the release of stored $NO_x$ and a component that is due to the release of stored $O_2$, and as shown in FIG. 3, this delay is therefore referred to herein as the combined $NO_x/O_2$ release time. To accurately determine the amount of $NO_x$ stored in the $NO_x$ adsorber, it is necessary to determine from this combined release time the amount of delay that is due to the $NO_x$ release alone. This can be accomplished by determining the amount of the combined release time that is due to oxygen release alone and then subtracting that time from the combine release time, as indicated by the following equation:

$NO_x$ release time=the combined release time−$O_2$ release time, (1)

This $O_2$ release time can be estimated using the delay time between the upstream and downstream sensors during the rich-to-lean transition. More specifically and as shown in FIG. 3, the delay at the beginning of the succeeding lean period is due to the storage in the $NO_x$ adsorber of the excess oxygen coming from the engine. Upon switching to lean operation, the excess oxygen immediately causes the upstream $O_2$ sensor to indicate a lean combustion condition. However, this excess oxygen is stored in the $NO_x$ adsorber and is not seen by the downstream $O_2$ sensor until a short time later, after the $O_2$ storage capacity of the $NO_x$ adsorber has been exceeded. Assuming that the time required to store oxygen in the $NO_x$ adsorber is approximately equal to the time required to release the stored oxygen, this measurable delay at the beginning of the lean period provides a good estimate of the amount of the combined $NO_x/O_2$ release time that is due to release of the $O_2$ alone. Thus, the measured $O_2$ storage time can be substituted into equation (1) above for the $O_2$ release time to yield the following equation:

$NO_x$ release time=the combined release time−$O_2$ storage time, (2)

The graph of FIG. 3 was generated using data measured with a 1.4 liter $NO_x$ adsorber that had been aged ten hours at 400° C. and that was running at a 480° C. bed temperature with a flow rate of 10 grams/sec and air/fuel ratio of 12:1 during the rich regeneration.

Once the $NO_x$ release time has been determined, the amount of $NO_x$ released can be determined and this number can be used as an estimate of the total amount of $NO_x$ stored during the previous lean period. Preferably, the measured $O_2$ storage time is subtracted from the combined release time measured during the same regeneration cycle. However, as an alternative, the $O_2$ storage time from one cycle can be subtracted from the combined release time measured during the next rich regeneration cycle. Moreover, for a given temperature, flow rate, and rich air/fuel ratio, if the $O_2$ storage time does not vary significantly from one cycle to the next, then it can be measured only periodically for different temperatures and used to update tables or equations that represent the $O_2$ storage time as a function of temperature, flow rate, and rich air/fuel magnitude. These tables or equations could then be used along with the current temperature, flow rate, and commanded air/fuel ratios to obtain an $O_2$ storage time for use in determining the $NO_x$ release time according to equation (2).

Whether using wide-range or switching sensors to determine the various delay times, it is necessary to determine the thresholds at which the sensor output will be considered indicative of the lean and rich combustion conditions. For example, in the graph shown in FIG. 3, the sensor outputs vary between zero and approximately one volt, with a lean combustion condition giving rise to a lower voltage and a rich condition giving rise to a higher voltage. If desired, a single intermediate voltage (such as 0.5 volts) could be used as the threshold for determining lean versus rich combustion, in which case any voltage less than 0.5 volts would be indicative of a lean combustion condition and any voltage above 0.5 volts indicative of a rich condition. Preferably, however, as indicated by the arrows in FIG. 3, values much closer to the limits of the sensor voltage are used as minimum thresholds for recognizing the engine operation as either being lean or rich. In particular, a rich combustion condition is only recognized when the sensor voltage equals or exceeds 0.8 volts and a lean condition is only recognized when the sensor voltage is less than or equal to 0.2 volts. Alternatively, one or both of these thresholds can be set at a certain percentage (e.g., 95%) of the full sensor voltage swing.

Figure 4:
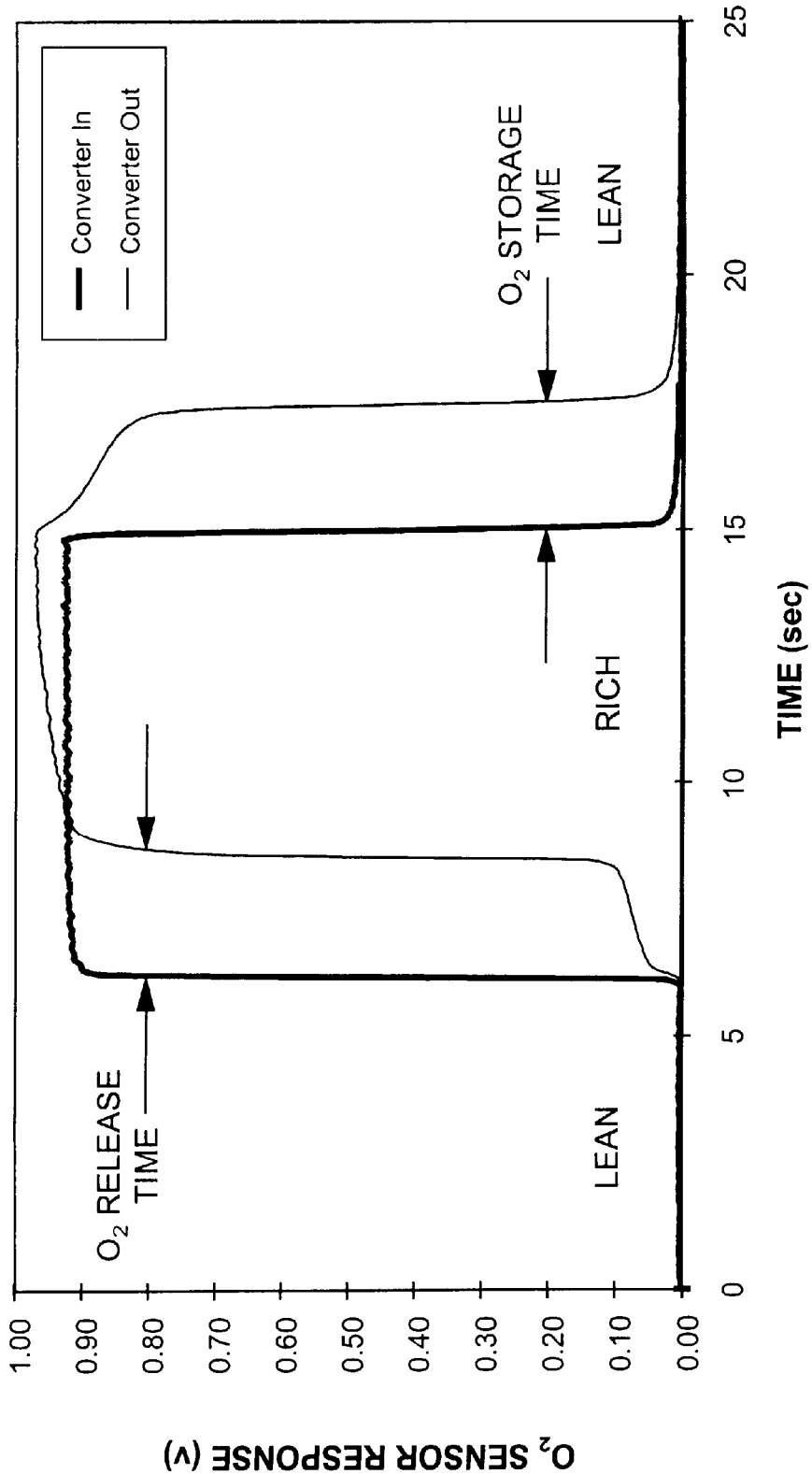
FIG. 4 is a graph showing the effect of release and storage of $O_2$ in the $NO_x$ adsorber on the delay between the upstream and downstream $O_2$ sensors.

The use of equation (2) assumes that the $O_2$ storage time provides a good estimation of the $O_2$ release time during the preceding and succeeding rich regeneration periods. As indicated in the graph of FIG. 4, the validity of this assumption has been empirically demonstrated. The data used for this graph was measured using a 1.7 liter $NO_x$ adsorber that had been aged ten hours at 400° C. and that was running at a 480° C. bed temperature with a flow rate of 10 grams/sec and air/fuel ratio of 12:1 during rich regeneration. The experiment was run such that very little $NO_x$ (0.18 grams) was stored by the $NO_x$ adsorber so that the effect of $O_2$ storage and release on the delay between the upstream and downstream sensors could be compared. As indicated in FIG. 4, the $O_2$ storage time is substantially the same as the time required to release the stored $O_2$ at the beginning of the rich regeneration period.

Figure 5:
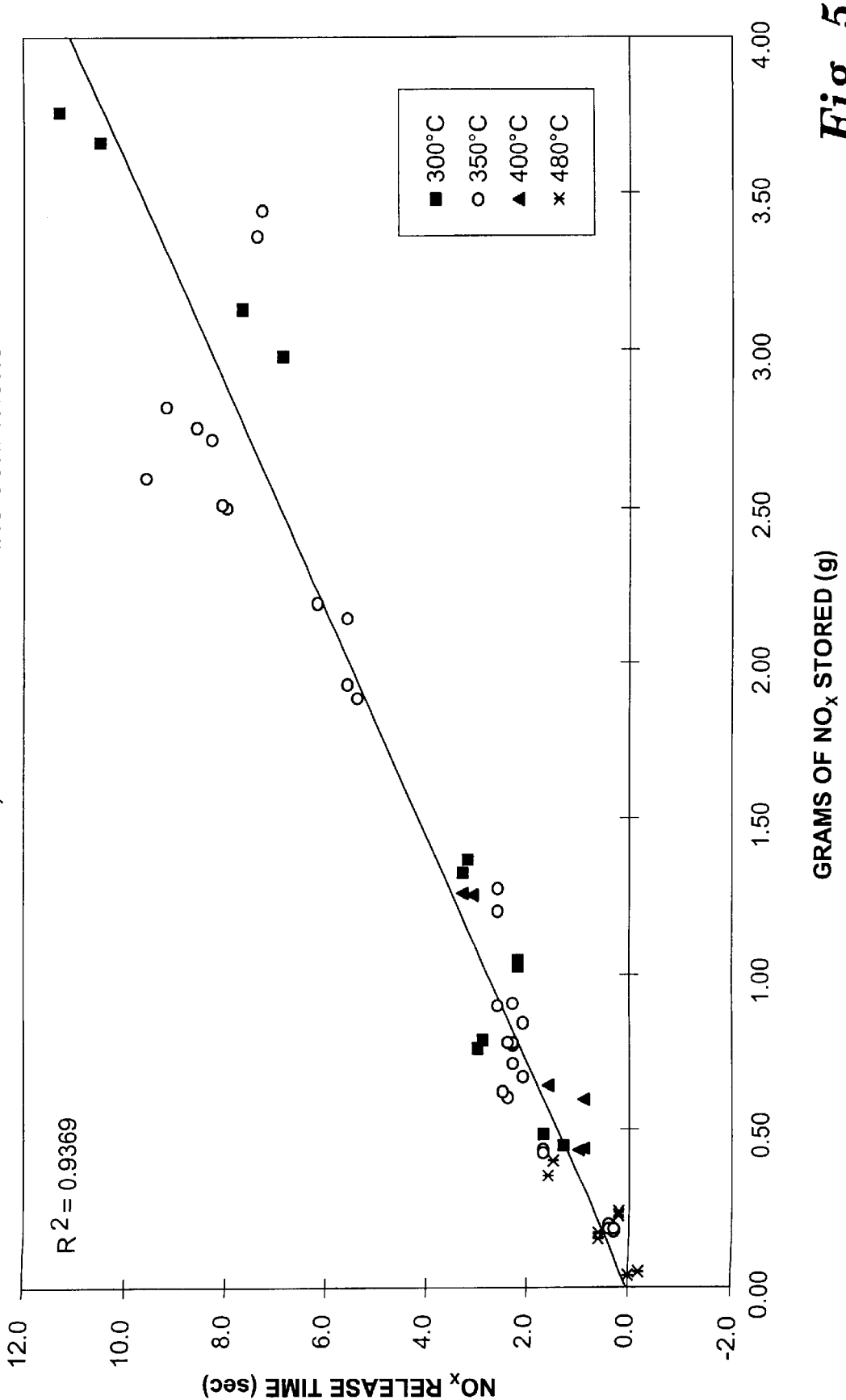
FIG. 5 is a graph showing the correlation between the calculated $NO_x$ release time and the actual grams of $NO_x$ stored for a typical $NO_x$ adsorber at differing temperatures.

Referring now to FIG. 5, it has also been empirically determined that there is good correlation between the $NO_x$ release time calculated according to equation (2) and the actual amount of $NO_x$ stored and that this correlation is substantially independent of $NO_x$ adsorber aging, adsorber volume, and bed temperature during the regeneration. The data shown in the figure was collected at different temperatures for a particular $NO_x$ adsorber technology with the lean cycle and the rich regeneration being maintained at the same temperature. The data shown is for different volumes of the adsorber (1.4 L and 2.8 L) and after various aging conditions. The data shown resulted from tests performed on a fresh adsorber and after aging at 400° C. for 10, 30, and 50 hours. The data also shows the results of tests run on samples after aging at 700° C. for 10, 30, and 50 hours. While the amount of $NO_x$ stored is a strong function of the adsorber volume, the aging condition, and the temperature during the lean cycle, the relationship between the $NO_x$ release time and the amount of $NO_x$ stored is basically independent of these parameters. The experimental data shows that, over a wide range of temperatures, there is a fairly linear relationship between the amount of $NO_x$ stored in the $NO_x$ adsorber and the $NO_x$ release time calculated according to equation (2). Thus, while the temperature and state of the $NO_x$ adsorber can have a substantial impact on its storage capacity, it does not significantly affect the relationship between the amount of stored $NO_x$ and the delay between the upstream and downstream $O_2$ sensors. Similarly, it has been found that the relationship between the amount of stored $NO_x$ and this delay time is also substantially independent of $NO_x$ adsorber volume.

Figure 6:
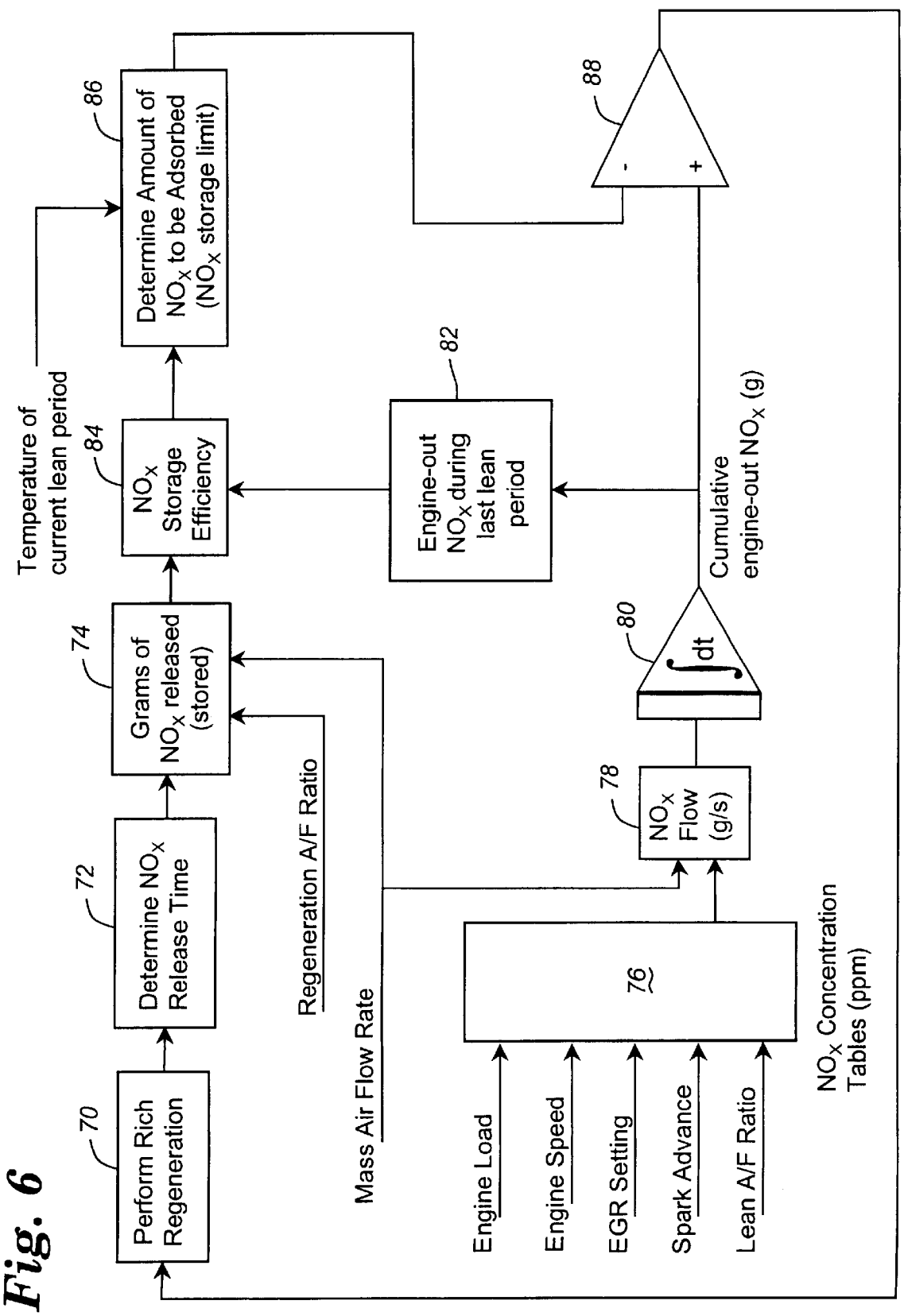
FIG. 6 is process diagram depicting the operation of the exhaust control system of FIG. 1.

Turning next to FIG. 6, there is shown a process diagram which is used by microprocessor 30 of FIG. 1 to provide closed loop control of the amount of engine-out $NO_x$ produced during each lean/rich cycle of engine operation. This closed loop control allows the system to provide very high conversion levels. In general, the process involves determining the amount of $NO_x$ produced by the engine during a previous period of lean combustion, determining the amount of $NO_x$ adsorbed by the $NO_x$ adsorber during that lean period, determining the storage efficiency of the $NO_x$ adsorber, determining a $NO_x$ storage limit which represents the $NO_x$ storage capacity of the $NO_x$ adsorber at a particular level of storage efficiency, monitoring the amount of $NO_x$ produced by the engine during the next lean period, and initiating a rich regeneration when the amount of $NO_x$ produced by the engine reaches the $NO_x$ storage limit. The $NO_x$ storage limit is determined using temperature-dependent stored $NO_x$ values that are adjusted upwards if the measured storage efficiency is greater than a desired efficiency, adjusted downwards if the measured storage efficiency is less than the desired efficiency, and maintained if the measured efficiency is equal to the desired efficiency.

Beginning at block 70, upon completion of a rich regeneration, a new lean period is initiated and the $NO_x$ release time can be calculated using equation (2) along with the most recently measured combined $NO_x/O_2$ release time and $O_2$ storage time. This is indicated at block 72. Then, as shown by block 74, using the magnitude of the regeneration air/fuel ratio and the measured mass air flow during regeneration, the amount of $NO_x$ released (and therefore stored) by the $NO_x$ adsorber can be determined. This determination can be accomplished either using a look-up table or an equation that relates $NO_x$ release time to the amount of $NO_x$ released. At the same time, the system begins determining the cumulative engine-out $NO_x$ produced by the engine since the start of the new lean period. The determination of engine-out $NO_x$ can be accomplished using such parameters as the engine load, engine speed, EGR valve setting, spark advance, and the current lean air/fuel ratio. The first two of these are measurements using the throttle position sensor 28 and engine speed 30 sensor 48, respectively. The last three of these are determined by microprocessor 30 as a part of separate engine operation processes, which are known to those skilled in the art. Using these parameters, the concentration of $NO_x$ in the engine emissions can be determined using equations or a table lookup, as indicated by block 76. Then, the determined $NO_x$ concentration can be combined with the measured mass air flow rate at block 78 to generate a $NO_x$ flow rate which, when integrated over time at block 80, provides an estimate of the total engine-out $NO_x$. Other similar techniques can be used to determine the amount of engine-out $NO_x$. See, for example, U.S. Pat. No. 5,437,153 to Takeshima, et al., the entire contents of which are hereby incorporated by reference.

Moving now to block 84, the cumulative engine-out $NO_x$ stored during the last lean period is saved each cycle, as indicated at block 82, and is used along with the stored $NO_x$ amount determined at block 74 to calculate the storage efficiency of the $NO_x$ adsorber during that last lean period. This can be done using the following equation:

$$NO_x \text{ adsorber storage efficiency} = \frac{\text{stored } NO_x \text{ amount}}{\text{engine-out } NO_x} \quad (3)$$

Then, using the determined storage efficiency along with the measured temperature during the current lean period, the $NO_x$ storage limit for the current temperature is determined, as indicated at block 86. As will be understood from the description further below, this $NO_x$ storage limit is not simply equal to the maximum amount of $NO_x$ that the $NO_x$ adsorber can store (at the current temperature), but rather the maximum amount that it can store at a particular desired efficiency (e.g., at 90%). That is, although the $NO_x$ adsorber may be able to store more $NO_x$ than is represented by the determined $NO_x$ storage limit, it can only do so at a lower efficiency than is desirable, which would result in an undesirably large amount of $NO_x$ passing through the $NO_x$ adsorber and being emitted into the environment. Thus, the $NO_x$ storage limit represents the amount of $NO_x$ to be adsorbed during the current lean period. Once the $NO_x$ storage limit is determined, it is compared at block 88 to the cumulative engine-out $NO_x$ which is, of course, ever-increasing as the lean period progresses. Once the engine-out $NO_x$ reaches the $NO_x$ storage limit, engine operation is switched to rich to regenerate the $NO_x$ adsorber, as indicated back at block 70. The cycle then repeats.

Figure 7:
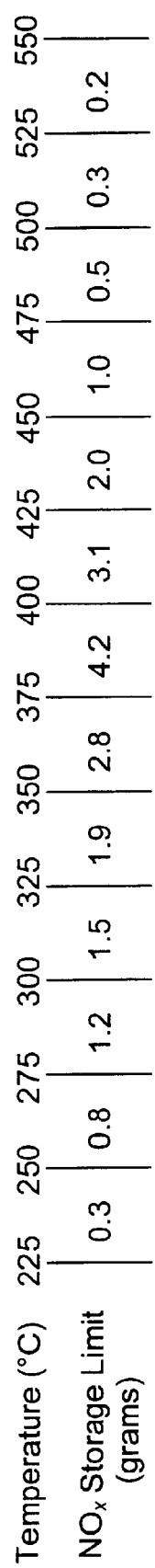
FIG. 7 is an exemplary $NO_x$ storage limit lookup table for use in the exhaust control system of FIG. 1.

The determination of the $NO_x$ storage limit can be accomplished by an equation or table lookup that provides a $NO_x$ value (in grams) representing the amount of engine-out $NO_x$ that the $NO_x$ adsorber is expected to be able to handle at the desired efficiency. This $NO_x$ value will be temperature dependent and, therefore, the temperature of the current lean period is used at this point so that the system can provide a $NO_x$ value that is appropriate for the current bed temperature. An exemplary lookup table is shown in FIG. 7. The spectrum of temperatures over which significant $NO_x$ adsorption is possible has been divided into a number of ranges. For each range, there is stored in non-volatile memory a $NO_x$ value that represents the grams of engine-out $NO_x$ that the $NO_x$ adsorber can handle at a particular storage efficiency. Determining the $NO_x$ storage limit then simply requires reading from memory the $NO_x$ value associated with the temperature range that spans the current temperature.

To provide negative feedback, the actual storage efficiency determined at block 84 is compared to the predetermined desired efficiency and, if the actual storage efficiency is greater, the $NO_x$ value produced by the equation or table lookup can be proportionally increased (e.g., by 5%), or, if the actual efficiency is less, the $NO_x$ value can be proportionally decreased (e.g., by 10%). That is, if the actual storage efficiency is found to be greater than the desired efficiency, then the $NO_x$ storage limit obtained using the equation or table lookup is in actuality too low (since it is based on an assumed lower efficiency) and needs to be increased. Conversely, if the storage efficiency is less than the desired efficiency, then the $NO_x$ storage limit is too high and should be decreased. If the efficiency equals the desired efficiency, then the $NO_x$ storage limits are maintained at the current levels. This will have the effect of either increasing, decreasing, or maintaining the length of the current lean period since the engine is operated lean until the amount of engine-out $NO_x$ equals that $NO_x$ limit.

Alternatively, stabilized closed loop control can be accomplished, not by simply adjusting the $NO_x$ value produced by the equation or table lookup, but by adjusting the equation parameters or the table values themselves. This adjustment can either be a percentage of the stored values (e.g., 5% or 10% as discussed above), or can be in the form of proportional error correction; that is, proportional to the difference between the determined storage efficiency and the desired storage efficiency. Moreover, the adjustment of the equation parameters or table values can be done according to temperature, either such that the $NO_x$ values at all temperatures are similarly adjusted, or so that the adjustment is more significant for certain temperature ranges than for others. For example, if the storage efficiency during the last lean period is below the desired level, a percentage decrease of 15% could be applied to the $NO_x$ storage amount in the range 250–275° C., while a percentage decrease of 12% could be applied to the $NO_x$ storage amount in the range 275–300° C. Also, rather than comparing the actual storage efficiency to a single predetermined desired efficiency, a window can be used, with the stored values of the $NO_x$ storage limit being used without adjustment up or down unless the actual efficiency is found to be outside this window. As will be apparent to those skilled in the art, by adjusting the $NO_x$ storage limit that is used to determine the length of the lean period, the system automatically adjusts to the current state of the $NO_x$ adsorber. This not only allows the system to reduce the lean period as the state of the $NO_x$ adsorber degenerates over time, but also allows the system to increase the lean period when the state of the $NO_x$ adsorber improves, such as after a sulfur purge.

Figure 8A:
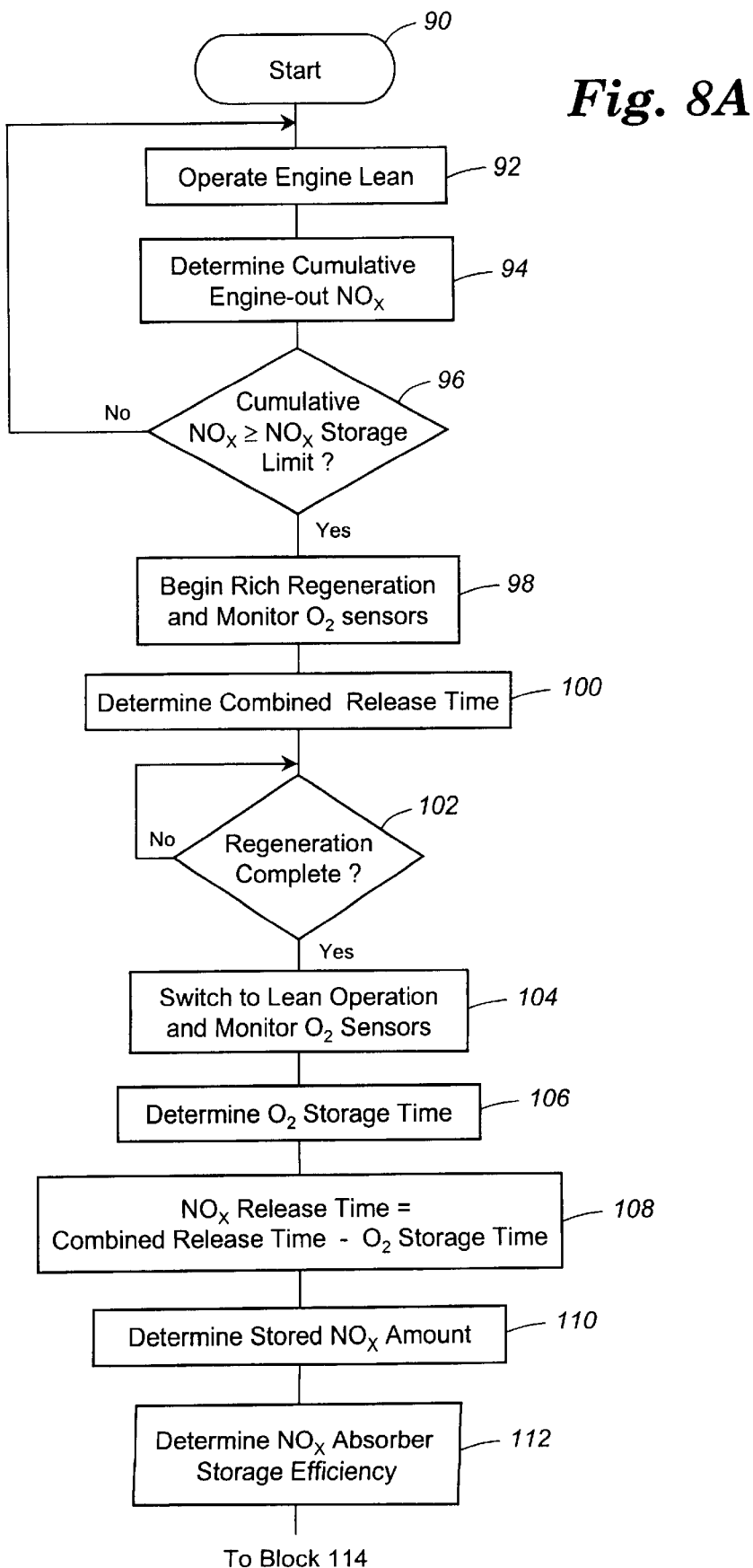
FIGS. 8A and 8B are flow charts that together depict the software process used in the exhaust control system of FIG. 1.
Figure 8B:
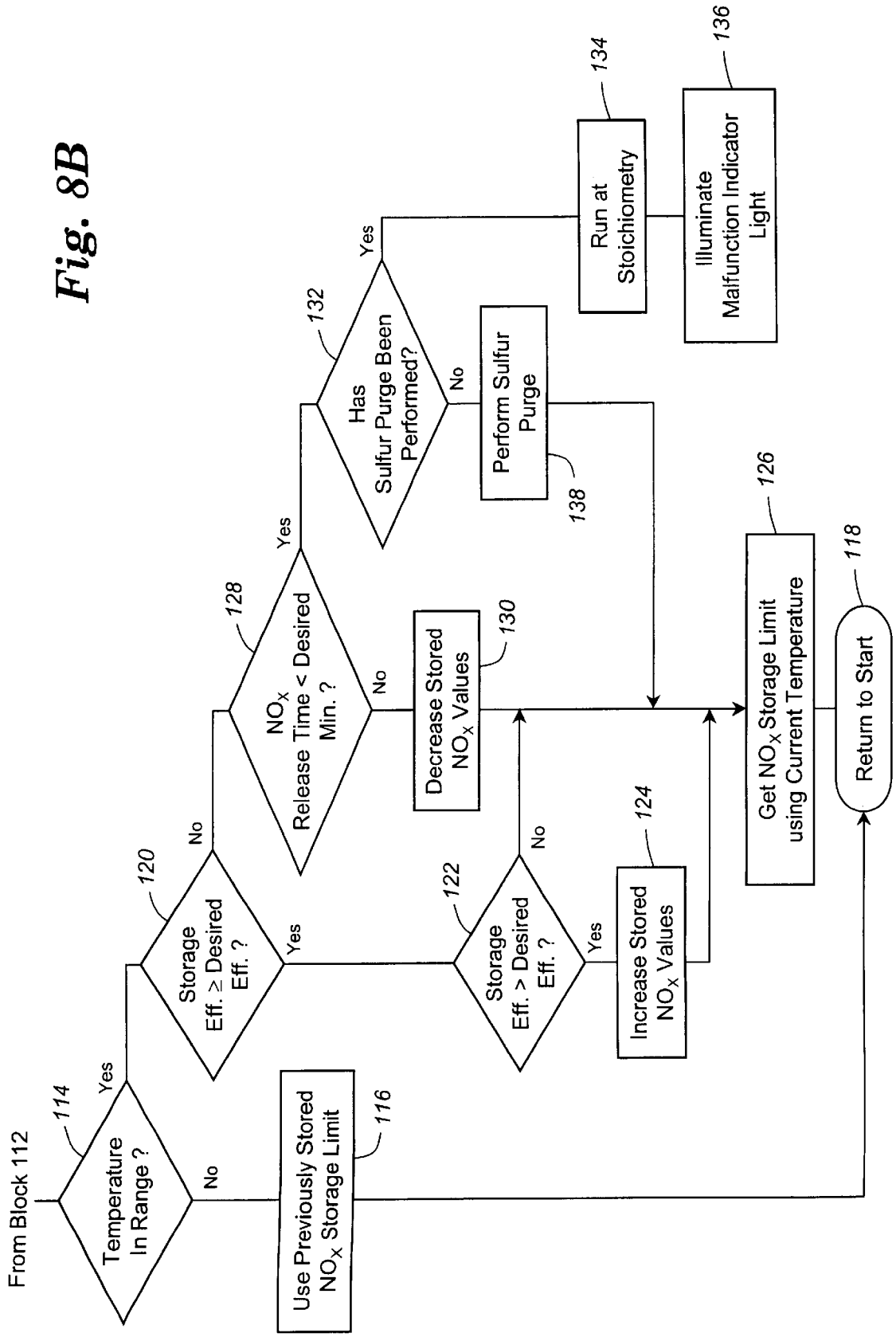

Turning now to FIGS. 8A and 8B, there is shown a flow chart of the program used by electronic control module 12 to carry out the process of FIG. 6. This program can be stored in ROM 38 and executed by microprocessor 30 either as a separate process or as part of an overall engine control algorithm. The process begins following start block 90 where the engine is operated lean (block 92) during which time the engine-out $NO_x$ is determined (block 94) and, as indicated at block 96, is then compared with the $NO_x$ storage limit obtained using either an equation or table lookup. The first time through this loop, there will have been no calculated $NO_x$ storage efficiency from a previous iteration, so that the $NO_x$ value obtained from the equation or table lookup will not be adjusted up or down. If the cumulative amount of engine-out $NO_x$ for the current lean period is less than the $NO_x$ storage limit, then the $NO_x$ adsorber is still capable of $NO_x$ storage at or above the desired efficiency and the process returns to block 92 where the lean engine operation is continued. This loop repeats until the engine-out $NO_x$ equals or exceeds the $NO_x$ storage limit, at which point the process flow moves to block 98 where the rich regeneration is initiated. During the regeneration, the $O_2$ sensors are monitored and, at block 100, the combined $NO_x/O_2$ release time is determined once the downstream $O_2$ sensor switches fully to indicate that it sees a rich combustion condition. Then, at block 102, a check is made to determine if the regeneration is complete. This check can be carried out by, for example, determining if the downstream $O_2$ sensor has reached a certain percentage (e.g., 95%) of the engine-out sensor's full-scale swing. If not, the process loops back on itself while regeneration continues. Once it is determined that the regeneration is complete, the process moves to block 104, where the engine operation is switched back to lean. The $O_2$ sensors are again monitored and, at block 106, the process determines the $O_2$ storage time which, as discussed above in connection with FIG. 3, is the delay between switching of the sensors to the lean combustion condition.

Now that the combined $NO_x/O_2$ release time and the $O_2$ storage time have been determined, the $NO_x$ release time can be determined using equation (2), as indicated at block 108. The amount of $NO_x$ released (and, thus, the stored $NO_x$ amount) is then determined at block 110 using the regeneration air/fuel ratio and air flow rate data discussed above in connection with FIG. 6. Preferably, this determination is made using a look-up table derived from FIG. 5 that relates the $NO_x$ release time, flow rate, and regeneration air/fuel ratio to the grams of $NO_x$ released. Next, the $NO_x$ adsorber storage efficiency is determined using equation (3), as indicated at block 112. Once the storage efficiency is determined, the process is ready to determine the next value of the $NO_x$ storage limit which will be used to determine the amount of engine-out $NO_x$ permitted during the current lean period before regeneration is begun. Although this next value of the $NO_x$ storage limit can be found using equations or table lookups, in the process described below a table lookup will be assumed, with the table comprising $NO_x$ values at the desired efficiency for each of several different bed temperatures.

To determine the next value of the $NO_x$ storage limit, a check is first made at block 114 to determine if the $NO_x$ adsorber is within the range of temperatures suitable for $NO_x$ adsorption. If not, then a pre-selected $NO_x$ storage limit is used, as indicated at block 116, and current loop ends at block 118 with the process then returning to start block 90 for another iteration using the pre-selected $NO_x$ storage limit obtained at block 116. If, at block 114, the bed temperature is within range, the process moves to block 120 where a check is made to determine if the storage efficiency of the $NO_x$ adsorber is greater than or equal to the desired efficiency. If so, a check is made at block 122 to determine if the storage efficiency is actually greater than the desired efficiency. If it is, then the $NO_x$ values stored in the lookup table are increased, as indicated by block 124. Thereafter, the process moves to block 126 where the (now adjusted) $NO_x$ storage limit is obtained from the table using the current bed temperature. If at block 122, the storage efficiency had equaled the desired efficiency, then no adjustment of the NO$_x$ table values is needed and the process would move directly to block 126 to obtain the new NO$_x$ storage limit from the table. The process then moves to block 118 for another iteration.

If, back at block 120, the storage efficiency was determined to be less than the desired efficiency, then the process moves to block 128 where a check is made to determine if the NO$_x$ release time calculated back at block 108 is less than a pre-selected desired minimum value. If so, this indicates that the state of the NO$_x$ adsorber has degenerated to a point at which a sulfur purge is needed, as will be discussed below. However, if the NO$_x$ release time is still above the pre-selected minimum acceptable value, then the process moves to block 130 where the NO$_x$ values stored in the lookup table are decreased, following which the process moves to block 126 and then to block 118 to perform another iteration. If, at block 128 it is determined that a sulfur purge is necessary, then the process moves to block 132 where a check is made to determine whether a sulfur purge has recently been performed. If so, this indicates that another sulfur purge will not adequately improve the state of the NO$_x$ adsorber and the process moves to block 134 where the engine is taken out of the lean/rich cycling and is run simply at stoichiometry. If desired, multiple sulfur purges can be performed prior to making a decision that a malfunction condition exists. Then, at block 136, the malfunction indicator light is illuminated to warn the driver of the abnormal engine operating condition. If, at block 132 no sulfur purge has recently been performed, the process moves to block 138 where a sulfur purge is carried out before moving to block 126 to obtain the next value of the NO$_x$ storage limit before beginning another iteration.

As will be appreciated, the storage efficiency will normally increase following the sulfur purge and this increase will be detected by the system, resulting in the stored NO$_x$ storage limit values being increased to take advantage of the greater NO$_x$ storage capacity resulting from the sulfur purge.

It will thus be apparent that there has been provided in accordance with the present invention an automotive exhaust control system and NO$_x$ adsorber diagnostic method and apparatus which achieve the aims and advantages specified herein. It will, of course, be understood that the foregoing description is of a preferred exemplary embodiment of the invention and that the invention is not limited to the specific embodiment shown. Various changes and modifications will become apparent to those skilled in the art and all such variations and modifications are intended to come within the scope of the appended claims.

I claim:

1. A method of operating an internal combustion engine having a NO$_x$ adsorber coupled to said engine to receive exhaust gases produced by said engine, and having first and second oxygen sensors with said first oxygen sensor being located upstream of said NO$_x$ adsorber to output a first signal related to the air/fuel ratio of the exhaust gases entering said NO$_x$ adsorber and said second oxygen sensor being located downstreams of said NO$_x$ adsorber to output a second signal related to the air/fuel ratio of the exhaust gases exiting said NO$_x$ adsorber, said first and second signals being variable between a first value indicative of a lean combustion condition and a second value indicative of a rich combustion condition, the method comprising the steps of:

(a) operating said engine at a lean combustion condition for a period of time sufficient to store O$_2$ and NO$_x$ in said NO$_x$ adsorber and then switching operation of said engine to a rich combustion condition, (b) determining a NO$_x$/O$_2$ release time that is related to the amount of time between switching of said first signal from its first value to its second value and switching of said second signal from its first value to its second value, whereby the NO$_x$/O$_2$ release time is dependent upon the time required to release stored NO$_x$ and stored O$_2$ from said NO$_x$ adsorber, (c) switching operation of said engine from a rich combustion condition to a lean combustion condition, (d) determining an O$_2$ storage time that is related to the amount of time between switching of said first signal from its second value to its first value and switching of said second signal from its second value to its first value, (e) determining a NO$_x$ release time using said NO$_x$/O$_2$ release time and said O$_2$ storage time, wherein said O$_2$ storage time is used as an estimate of the time required to release stored O$_2$ from said NO$_x$ adsorber, and (f) operating said engine in a lean combustion condition for a length of time that is dependent upon said NO$_x$ release time.

2. The method of claim 1, further comprising the step of determining a stored NO$_x$ amount using said NO$_x$ release time, wherein said stored NO$_x$ amount is related to the amount of NO$_x$ stored in said NO$_x$ adsorber during said period of time.

3. The method of claim 2, further comprising the step of determining an engine-out NO$_x$ amount representing the amount of NO$_x$ produced by said engine during said period of time, wherein step (f) further comprises operating said engine in a lean combustion condition for a length of time that is dependent upon said stored NO$_x$ amount and said engine-out NO$_x$ amount.

4. The method of claim 2, further comprising the step of determining a NO$_x$ storage limit using said stored NO$_x$ amount, wherein step (f) further comprises determining an engine-out NO$_x$ amount while operating said engine at said lean combustion condition during said length of time and switching operation of said engine from said lean combustion condition to said rich combustion condition when the engine-out NO$_x$ equals or exceeds said NO$_x$ storage limit.

5. The method of claim 2, wherein, during operation of said engine in said rich combustion condition, said engine is operated at an air/fuel ratio with said exhaust gases being exhausted from said engine at a measurable flow rate, and wherein said step of determining a stored NO$_x$ amount further comprises determining said stored NO$_x$ amount using values indicative of said NO$_x$ release time, said air/fuel ratio, and said flow rate.

6. The method of claim 5, further comprising the step of measuring the flow rate of air entering said engine and using the flow rate of said air to determine said measurable flow rate.

7. The method of claim 1, wherein steps (c) and (d) are carried out prior to steps (a) and (b).

8. A method of operating an internal combustion engine having a NO$_x$ adsorber coupled to said engine to receive exhaust gases produced by said engine, and having first and second oxygen sensors with said first oxygen sensor being located upstream of said NO$_x$ adsorber to output a first signal related to the air/fuel ratio of the exhaust gases entering said NO$_x$ adsorber and said second oxygen sensor being located downstream of said NO$_x$ adsorber to output a second signal related to the air/fuel ratio of the exhaust gases exiting said NO$_x$ adsorber, said first and second signals being variable between a first value indicative of a lean combustion condition and a second value indicative of a rich combustion condition, the method comprising the steps of:

(a) operating said engine at a lean combustion condition for a period of time and then switching operation of said engine to a rich combustion condition, (b) determining a $NO_x/O_2$ release time that is related to the amount of time between switching of said first signal from its first valued to its second value and switching of said second signal from its first value to its second value, (c) switching operation of said engine from a rich combustion condition to a lean combustion condition, (d) determining on $O_2$ storage time that is related to the amount of time between switching of said first signal from its second value to it first value and switching of said second signal from its second value to its first value, (e) determining a $NO_x$ release time by subtracting the $O_2$ storage time from the $NO_x/O_2$ realease time, and (f) operating said engine in a lean combustion condition for a length of time that is dependent upon the $NO_x$ release time.

9. A method of operating an internal combustion engine having a $NO_x$ adsorber coupled to said engine to receive exhaust gases produced by said engine, and having first and second oxygen sensors with said first oxygen sensor being located upstream of said $NO_x$ adsorber to output a first signal related to the air/fuel ration of the exhaust gases entering said $NO_x$ adsorber and said second oxygen sensor being located downstream of said $NO_x$ adsorber to output a second signal related to the air/fuel ration of the exhaust gases exiting said $NO_x$ adsorber, said first and second signals being variable between a first value indicative of a lean combustion condition and a second value indicative of a rich combustion condition, the method comprising the steps of:

(a) operating said engine at a lean combustion condition for a period of time and then switching operation of said engine to a rich combustion condition, (b) determining a $NO_x/O_2$ release time that is related to the amount of time between switching of said first signal from its first value to its second value and switching of second signal from its first value to its second value, (c) switching operation of said engine from a rich combustion condition to a lean combustion condition, (d) determining an $O_2$ storage time that is related to the amount of time between switching of said first signal from its second value to its first value and switching of said second signal from its second value to its first value, (e) determining a $NO_x$ release time using said $NO_x/O_2$ release time and said $O_2$ storage time, (f) determining a stored $NO_x$ amount using said $NO_x$ release time, wherein said stored $NO_x$ amount is related to the amount of $NO_x$ stored in said $NO_x$ adsorber during said period of time, (g) determining an engine-out $NO_x$ amount representing the amount of $NO_x$ produced by said engine during said period of time, (h) determining a $NO_x$ adsorber storage efficiency using said stored $NO_x$ amount and said engine-out $NO_x$ amount and (i) operating said engine in a lean combustion condition for a length of time that is dependant upon said $NO_x$ adsorber storage efficiency.

10. The method of claim 9, further comprising the step of determining a $NO_x$ storage limit for said $NO_x$ adsorber, wherein step (f) further comprises determining an engine-out $NO_x$ amount while operating said engine at said lean combustion condition during said length of time and switching operation of said engine from said lean combustion condition to said rich combustion condition when the engine-out $NO_x$ equals or exceeds said $NO_x$ storage limit.

11. The method of claim 10, wherein said $NO_x$ storage limit represents the amount of $NO_x$ that can be stored by said $NO_x$ adsorber at one or more particular storage efficiencies.

12. The method of claim 10, wherein said step of determining a $NO_x$ storage limit further comprises obtaining a value representing said $NO_x$ storage limit, increasing said value if said $NO_x$ adsorber storage efficiency is greater than a first selected efficiency, decreasing said value if said $NO_x$ adsorber storage efficiency is less than a second selected efficiency, and thereafter using said value as said $NO_x$ storage limit.

13. The method of claim 12, wherein said first selected efficiency and said second selected efficiency are equal to a pre-selected efficiency.

14. A method of operating an internal combustion engine connected to an exhaust system having a $NO_x$ adsorber, comprising the steps of:

(a) operating said engine at a lean combustion condition for a period of time to thereby store $NO_x$ in said $NO_x$ adsorber and then switching operation of said engine to a rich combustion condition to thereby release and convert the $NO_x$ from said $NO_x$ adsorber, (b) determining an engine-out $NO_x$ amount that is related to the amount of $NO_x$ exhausted from said engine during said period of time, (c) determining a $NO_x$ release time that is related to the amount of time required to release the $NO_x$ during the rich combustion condition, (d) determining a stored $NO_x$ amount using said $NO_x$ release time, (e) calculating a $NO_x$ adsorber storage efficiency using said engine-out $NO_x$ amount and said stored $NO_x$ amount, and (f) operating said engine in a lean combustion condition for a length of time that is dependent upon said $NO_x$ adsorber storage efficiency.

15. The method of claim 14, wherein said exhaust system includes first and second oxygen sensors, said first oxygen sensor being located upstream of said $NO_x$ adsorber to output a first signal related to the air/fuel raatio of the exhaust gases entering said $NO_x$ adsorber and said second oxygen sensor being located downstream of said $NO_x$ adsorber to output a second signal related to the air/fuel ratio of the exhaust gases exiting said $NO_x$ adsorber, said first and second signals being variable between a first value indicative of a lean combustion condition and a second value indicative of a rich combustion condition, and wherein step (c) further comprises:

determining a $NO_x/O_2$ release time that is related to the amount of time between switching of said first signal from its first value to its second value and switching of said second signal from its first value to its second value, switching operation of said engine from said rich combustion condition to said lean combustion condition, determining an $O_2$ storage time that is related to the amount of time between switching of said first signal from its second value to its first value and switching of said second signal from its second value to its first value, and determining said $NO_x$ release time using said $NO_x/O_2$ release time and said $O_2$ storage time.

16. The method of claim 14, further comprising the step of determining a $NO_x$ storage limit, wherein step (f) further comprises determining an engine-out $NO_x$ amount while operating said engine at said lean combustion condition during said length of time and switching operation of said engine from said lean combustion condition to said rich combustion condition when the engine-out $NO_x$ amount satisfies a predetermined requisite relationship with said $NO_x$ storage limit.

17. The method of claim 16, wherein said step of determining a $NO_x$ storage limit further comprises obtaining a value representing said $NO_x$ storage limit, increasing said value if said $NO_x$ adsorber storage efficiency is greater than a first selected efficiency, decreasing said value if said $NO_x$ adsorber storage efficiency is less than a second selected efficiency, and thereafter using said value as said $NO_x$ storage limit.

18. The method of claim 17, wherein said first selected efficiency and said second selected efficiency are equal to a pre-selected efficiency.

19. The method of claim 16, wherein the step of obtaining a $NO_x$ storage limit for said $NO_x$ adsorber further comprises:
   providing a number of $NO_x$ values stored in memory, each of which is associated with a temperature range,
   determining a temperature within the exhaust system, and
   selecting the $NO_x$ value associated with the temperature range that includes said temperature.

20. The method of claim 19, wherein the step of obtaining a $NO_x$ storage limit further comprises, the step of increasing one or more of said $NO_x$ values if said $NO_x$ storage efficiency is greater than a first selected efficiency and decreasing one or more of said $NO_x$ values if said $NO_x$ storage efficiency is less than a second selected efficiency.

21. The method of claim 20, wherein said first selected efficiency and said second selected efficiency are equal to a pre-selected efficiency, and wherein the step of obtaining a $NO_x$ storage limit further comprises adjusting one or more of said $NO_x$ values by an amount that is proportional to the difference between said $NO_x$ storage efficiency and said pre-selected efficiency.

22. A method for determining the amount of $NO_x$ stored in a $NO_x$ adsorber during operation of an internal combustion engine as a lean air/fuel ratio, said engine being coupled to said $NO_x$ adsorber to supply said $NO_x$ adsorber with exhaust gases produced by said engine, said engine including a first oxygen sensor located upstream of said $NO_x$ adsorber and a second oxygen sensor located downstream of said $NO_x$ adsorber with said first and second oxygen sensors each being operable to detect components in the exhaust gases indicative of operation of said engine at either a lean or rich air/fuel ratio, the method comprising the steps of:
   (a) operating the engine at a lean air/fuel ratio for a period of time sufficient to store $O_2$ and $NO_x$ in said $NO_x$ adsorber and then switching operation of the engine to a rich air/fuel ratio,
   (b) determining a $NO_x/O_2$ release time that is related to the amount of time between detection by the first oxygen sensor of a rich combustion condition and detection by the second oxygen sensor of the rich combustion condition, whereby the $NO_x/O_2$ release time is dependent upon the time required to release stored $NO_x$ and stored $O_2$ from said $NO_x$ adsorber,
   (c) switching operation of the engine from the rich air/fuel ratio to a lean air/fuel ratio,
   (d) determining an $O_2$ storage time that is related to the amount of time between detection by the first oxygen sensor of a lean combustion condition and detection by the second oxygen sensor of the lean combustion condition,
   (e) determining a $NO_x$ release time using the $NO_x/O_2$ release time and the $O_2$ storage time, wherein said $O_2$ storing time is used as an estimate of the time required to release stored $O_2$ from said $NO_x$ adsorber, and
   (f) determining a stored $NO_x$ amount using said $NO_x$ release time, wherein said stored $NO_x$ amount is related to the amount of $NO_x$ stored in said $NO_x$ adsorber during said period of time.

23. A method for determining the amount of $NO_x$ stored in a $NO_x$ adsorber during operation of an internal combustion engine at a lean air/fuel ratio, said engine being coupled to said $NO_x$ adsorber to supply said $NO_x$ adsorber with exhaust gases produced by said engine, said engine including a first oxygen sensor located upstream of said $NO_x$ adsorber and a second oxygen sensor located downstream of said $NO_x$ adsorber, with said first and second oxygen sensors each being operable to detect components in the exhaust gases indicative of operation of said engine at either a lean or rich air/fuel ratio, the method comprising the steps of:
   (a) operating the engine at a lean air/fuel ratio for a period of time and then switching operation of the engine to a rich air/fuel ratio,
   (b) determining a $NO_x/O_2$ release time that is related to the amount of time between detection by the first oxygen sensor of a rich combustion condition said detection by the second oxygen sensor of the rich combustion condition,
   (c) switching operation of the engine from the rich air/fuel ratio to a lean air/fuel ratio.
   (d) determining an $O_2$ storage time that is related to the amount of time between detection by the first oxygen sensor of a lean combustion condition and detection by the second oxygen sensor of the lean combustion condition,
   (e) determining a $NO_x$ release time by subtracting the $O_2$ storage time from the $NO_x/O_2$ release time, and
   (f) determining a stored $NO_x$ amount using said $NO_x$ release time, wherein said stored $NO_x$ amount is related to the amount of $NO_x$ stored in said $NO_x$ adsorber during said period of time.

24. The method of claim 22, wherein, during operation of said engine at said rich air/fuel ratio, said exhaust gases are exhausted from said engine at a measurable flow rate, and wherein said step of determining a stored $NO_x$ amount further comprises determining said stored $NO_x$ amount using values indicative of said $NO_x$ release time, said rich air/fuel ratio, and said flow rate.

25. An apparatus for use in connection with a $NO_x$ adsorber to control operation of an internal combustion engine that is coupled to the $NO_x$ adsorber via an exhaust passage, comprising:
   an electronic control unit;
   a first oxygen sensor located upstream of the $NO_x$ adsorber, said first oxygen sensor having an output coupled to said electronic control unit and being operable to provide said electronic control unit with a first signal related to the air/fuel ratio of exhaust gases entering the $NO_x$ adsorber; and
   a second oxygen sensor located downstream of the $NO_x$ adsorber, said second oxygen sensor having an output coupled to said electronic control unit and being operable to provide said electronic control unit with second signal related to the air/fuel ratio of the exhaust gases exiting the $NO_x$ adsorber, said first and second signals being variable between a first value indicative of a lean combustion condition and a second value indicative of a rich combustion condition;

said electronic control unit being operable to switch operation of the engine from said lean combustion condition to said rich combustion condition at a point in time that is determined using (1) a first delay related to the amount of time between switching of said first sensor from its first value it its second value and switching of said second sensor from its first value to its second value and (2) a second delay relating to the amount of time between switching of said first sensor from its second value to its first value and switching of said second sensor from its second value to its first value; and said electronic control unit being operable to determine said point in time by using said second delay to determine the amount of time used during said first delay to release $O_2$ from said $NO_x$ adsorber.

26. An apparatus as defined in claim 25, wherein said electronic control unit is operable to determine a stored $NO_x$ amount using said delays, wherein said stored $NO_x$ amount is related to the amount of $NO_x$ released from the $NO_x$ adsorber during operation in said lean combustion condition.

27. An apparatus as defined in claim 25, wherein said oxygen sensors comprise switching oxygen sensors.

* * * * *

UNITED STATES PATENT AND TRADEMARK OFFICE
CERTIFICATE OF CORRECTION

PATENT NO. : 6,497,092 B1
DATED : December 24, 2002
INVENTOR(S) : Joseph R. Theis It is certified that error appears in the above-identified patent and that said Letters Patent is hereby corrected as shown below:

<u>Title page,</u>
Item [54], delete "ABSORBER" and insert therefor -- ADSORBER --

Signed and Sealed this

Eleventh Day of November, 2003

JAMES E. ROGAN
*Director of the United States Patent and Trademark Office*